United States Patent
Moon et al.

(10) Patent No.: US 11,024,902 B2
(45) Date of Patent: Jun. 1, 2021

(54) BATTERY CELL HAVING RECESSED PORTION FORMED IN CONNECTION REGION BETWEEN RECEIVING UNITS

(71) Applicant: LG Chem, Ltd., Seoul (KR)

(72) Inventors: Tae Young Moon, Daejeon (KR); Woo Yong Lee, Daejeon (KR)

(73) Assignee: LG Chem, Ltd.

( * ) Notice: Subject to any disclaimer, the term of this patent is extended or adjusted under 35 U.S.C. 154(b) by 143 days.

(21) Appl. No.: 16/340,198

(22) PCT Filed: Apr. 2, 2018

(86) PCT No.: PCT/KR2018/003854
§ 371 (c)(1),
(2) Date: Apr. 8, 2019

(87) PCT Pub. No.: WO2018/186637
PCT Pub. Date: Oct. 11, 2018

(65) Prior Publication Data
US 2019/0312237 A1    Oct. 10, 2019

(30) Foreign Application Priority Data

Apr. 6, 2017 (KR) .......... 10-2017-0044847

(51) Int. Cl.
*H01M 4/02* (2006.01)
*H01M 50/10* (2021.01)
(Continued)

(52) U.S. Cl.
CPC ......... *H01M 50/10* (2021.01); *H01M 10/049* (2013.01); *H01M 10/0413* (2013.01);
(Continued)

(58) Field of Classification Search
CPC .................................................. H01M 4/02
See application file for complete search history.

(56) References Cited

U.S. PATENT DOCUMENTS 8,173,293 B2   5/2012  Kim
9,209,428 B2  12/2015  Jung et al.
(Continued)

FOREIGN PATENT DOCUMENTS

JP    2004055153 A    2/2004
JP   20040071302 A    3/2004
(Continued)

OTHER PUBLICATIONS

International Search Report for PCT/KR2018/003854 dated Nov. 14, 2018.

*Primary Examiner* — Jacob B Marks
(74) *Attorney, Agent, or Firm* — Lerner, David, Littenberg, Krumholz & Mentlik, LLP

(57) ABSTRACT

Disclosed herein is a battery cell including a battery case having an initial position and an assembled position, and an electrode assembly. The electrode assembly may include a positive electrode, a negative electrode, and a separator interposed between the positive electrode and the negative electrode. The electrode assembly may be mounted in the battery case in the assembled position. The battery case may include a first receiving unit and a second receiving unit formed in the battery case and spaced apart from each other when the battery case is in the initial position, the first and second receiving units receiving a respective portion of the electrode assembly when the battery case is in the assembled position, and a bridge region having a recessed portion that is recessed in a direction identical to the depth direction of each of the receiving units when the battery case is in the initial position.

13 Claims, 4 Drawing Sheets

(51) Int. Cl.
   *H01M 10/04* (2006.01)
   *H01M 50/20* (2021.01)
   *H01M 50/116* (2021.01)

(52) U.S. Cl.
   CPC ..... *H01M 10/0436* (2013.01); *H01M 50/116* (2021.01); *H01M 50/20* (2021.01); *H01M 2220/20* (2013.01); *H01M 2220/30* (2013.01)

(56) References Cited

U.S. PATENT DOCUMENTS

| | | |
|---|---|---|
| 2009/0023057 A1 | 1/2009 | Kim |
| 2009/0311592 A1 | 12/2009 | You et al. |
| 2010/0143787 A1 | 6/2010 | Jung et al. |
| 2016/0079576 A1 | 3/2016 | Lim et al. |
| 2016/0093838 A1 | 3/2016 | Kwon et al. |
| 2017/0025723 A1 | 1/2017 | Isozaki et al. |
| 2018/0358657 A1* | 12/2018 | Ihara ................ H01M 10/0567 |

FOREIGN PATENT DOCUMENTS

| | | | |
|---|---|---|---|
| JP | 2011096418 A | | 5/2011 |
| KR | 20060011428 A | | 2/2006 |
| KR | 2006-0034364 | * | 10/2007 |
| KR | 20070102768 A | | 10/2007 |
| KR | 20080041113 A | | 5/2008 |
| KR | 100870355 B1 | | 11/2008 |
| KR | 20140030431 A | | 3/2014 |
| KR | 20160003548 A | | 1/2016 |
| KR | 20160032906 A | | 3/2016 |
| KR | 20160036282 A | | 4/2016 |
| KR | 20170022156 A | | 3/2017 |
| WO | 2015140952 A1 | | 9/2015 |

* cited by examiner

[FIG. 1]
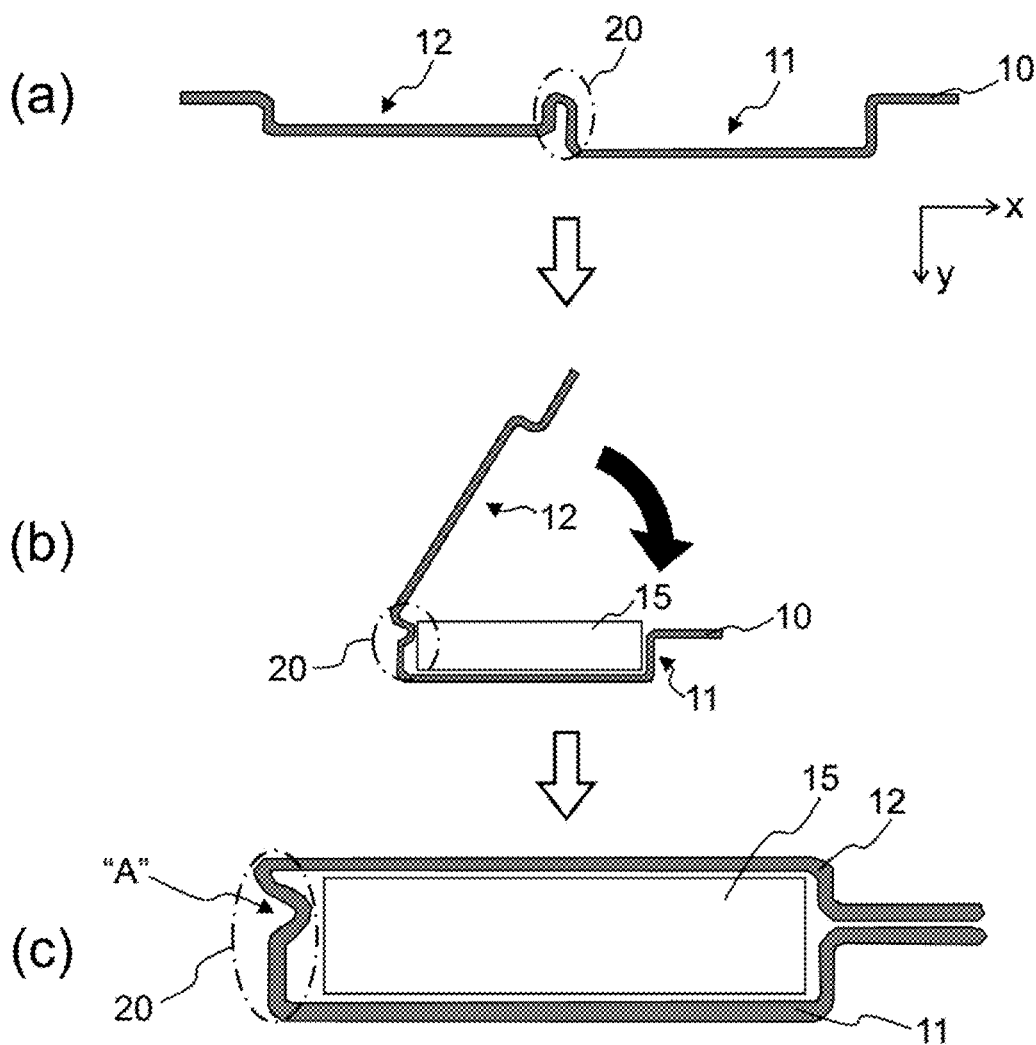

[FIG. 2]
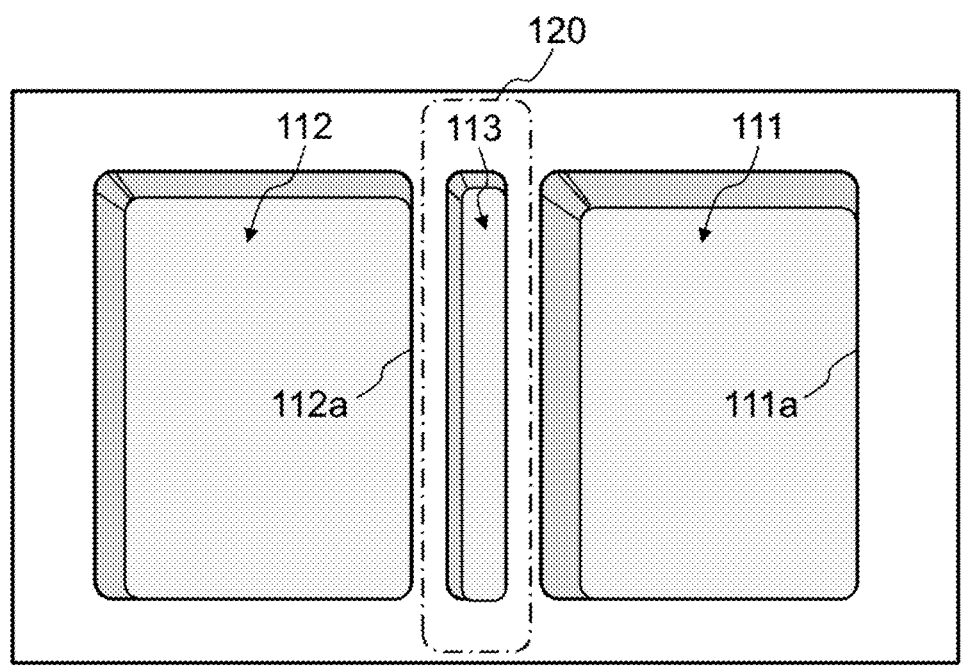
[FIG. 3]
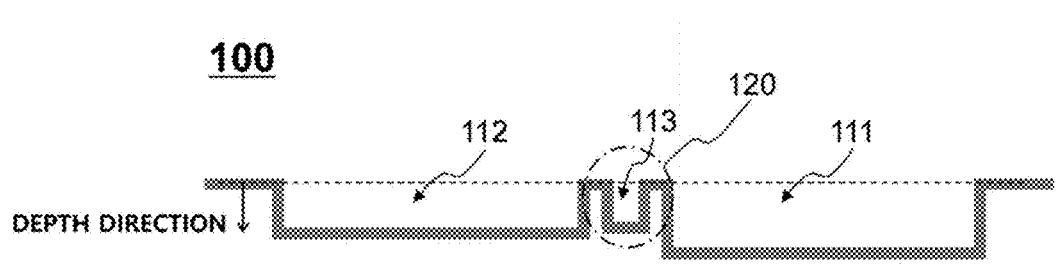

[FIG. 4]
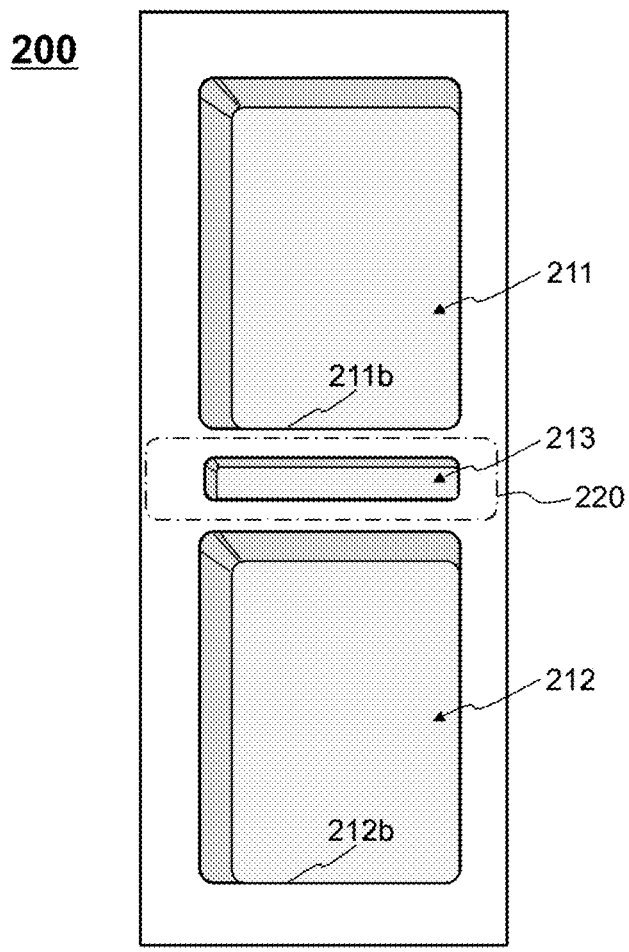

[FIG. 5]
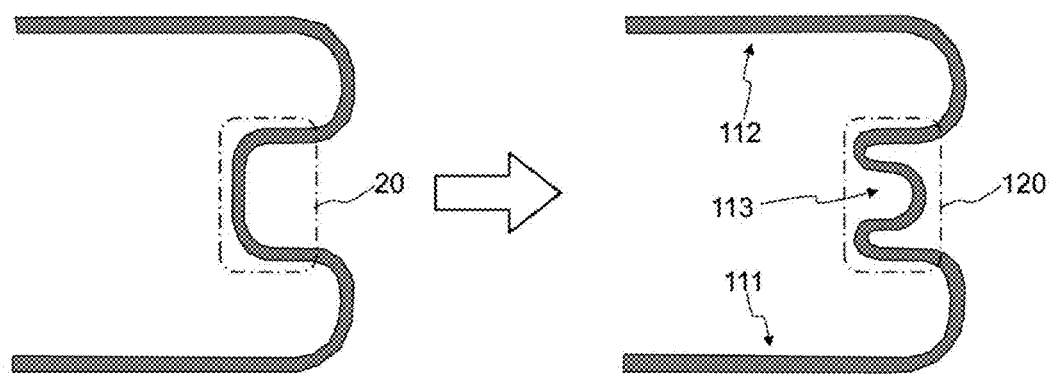

BATTERY CELL HAVING RECESSED PORTION FORMED IN CONNECTION REGION BETWEEN RECEIVING UNITS

CROSS-REFERENCE TO RELATED APPLICATIONS

This application is a national phase entry under 35 U.S.C. § 371 of International Patent Application No. PCT/KR2018/003854, filed on Apr. 2, 2018, published in Korean, which claims priority from Korean Patent Application No. 10-2017-0044847, filed on Apr. 6, 2017, the disclosures of which are incorporated herein by reference.

TECHNICAL FIELD

The present invention relates to a battery cell having a recessed portion formed in a connection region between receiving units.

BACKGROUND ART

As mobile devices have been continually developed and the demand for such mobile devices has increased, the demand for secondary batteries as energy sources for such mobile devices has sharply increased. Among such secondary batteries is a lithium secondary battery, having high energy density and high discharge voltage, into which much research has been carried out and which has now been commercialized.

Typically, in terms of the shape of batteries, the demand for prismatic secondary batteries or pouch-shaped secondary batteries that are thin enough to be applied to products such as cellular phones is very high. In terms of the material for batteries, on the other hand, the demand for lithium secondary batteries, such as lithium ion batteries or lithium ion polymer batteries, which exhibit high energy density, discharge voltage, and output stability, is also very high.

Such secondary batteries may be classified into a cylindrical battery cell, a prismatic battery cell, and a pouch-shaped battery cell based on the shapes thereof. Among these battery cells, the pouch-shaped battery cell, which can be stacked with high integration, has high energy density per unit weight, is inexpensive, and can be easily modified, has attracted considerable attention.

A pouch-shaped secondary battery uses a laminate sheet as a battery case, and is configured to have a structure in which an electrode assembly is received in a receiving unit formed in the laminate sheet together with an electrolytic solution.

FIG. 1 is a schematic view showing a process of manufacturing a conventional battery cell.

FIG. 1(a) is a vertical sectional view schematically showing a structure in which two receiving units are formed in a battery case, which is made of a single member. Referring to FIG. 1, a first receiving unit 11 and a second receiving unit 12, which are configured to be recessed in the y-axis direction, are formed in a battery case 10, and the battery case 10 includes a bridge region 20 for interconnecting the receiving units 11 and 12.

The first receiving unit 11 is located on the right side of the bridge region 20, and the second receiving unit 12 is located on the left side of the bridge region 20.

FIG. 1(b) is a view schematically showing a process of bending the bridge region such that the receiving units of FIG. 1(a) come into contact with each other, and FIG. 1(c) is a schematic view showing a structure in which an electrode assembly is received in the receiving units in the state in which the receiving units are in contact with each other as the result of bending the bridge region.

Referring to FIG. 1(b), an electrode assembly 15 is mounted in the first receiving unit 11, and the bridge region 20 is bent such that the first receiving unit 11 and the second receiving unit 12 come into contact with each other.

Referring to FIGS. 1(b) and 1(c), the electrode assembly 15 is received in the battery case 10 in the state of being covered by the first receiving unit 11 and the second receiving unit 12, and the bridge region 20 is bent, whereby a specific portion A of the bridge region 20 is dented in the state in which outer sides of the first receiving unit 11 and the second receiving unit 12 are aligned with each other.

Therefore, there is an urgent necessity for a battery cell configured such that the rigidity of a bent portion of a battery case made of a single member is sufficiently secured in order to prevent the bent portion of the battery case from being dented.

DISCLOSURE

Technical Problem

An object of the present invention is to provide a battery cell configured to have a structure in which a bridge region, which interconnects two receiving units formed in a battery case made of a single member, is provided with a recessed portion in order to secure the rigidity of the bridge region, thereby preventing the bridge region from being dented into the battery case in order to ensure the uniform external appearance of the battery case.

Technical Solution

In accordance with an aspect of the present invention, the above and other objects can be accomplished by the provision of a battery cell including a battery case having an initial position and an assembled position, and an electrode assembly. The electrode assembly may include a positive electrode, a negative electrode, and a separator interposed between the positive electrode and the negative electrode. The electrode assembly may be mounted in the battery case in the assembled position. The battery case may include a first receiving unit and a second receiving unit formed in the battery case and spaced apart from each other when the battery case is in the initial position, the first and second receiving units receiving a respective portion of the electrode assembly when the battery case is in the assembled position, and a bridge region having a recessed portion that is recessed in a direction identical to the depth direction of each of the receiving units when the battery case is in the initial position.

Here, the bridge region may be a region that interconnects the first receiving unit and the second receiving unit, which are formed in the battery case.

In the case in which the recessed portion is locally formed in the bridge region, therefore, it is possible to prevent the bent portion of the battery case from being caught in or dented into the battery case at the time of bending the battery case, whereby it is possible to maintain a uniform external appearance of the battery cell. In addition, it is possible to secure the rigidity of the bent portion of the battery case, whereby it is possible to prevent the battery case from being damaged by impact applied to the lower part of the battery case.

In a concrete example, each of the first receiving unit and the second receiving unit may have a rectangular shape, and a depth of the second receiving unit may be 50% to 80% of a depth of the first receiving unit.

The reason that the depth of the first receiving unit is greater than the depth of the second receiving unit is that the electrode assembly is mounted in the first receiving unit and then the upper part of the electrode assembly is covered by the second receiving unit after the bridge region is bent.

The receiving units, each of which has a rectangular structure, may be formed in the battery case at various positions of the battery case. For example, the first receiving unit and the second receiving unit may be formed such that the long side of the first receiving unit when viewed in a horizontal sectional view and the long side of the second receiving unit when viewed in a horizontal sectional view are opposite each other. Alternatively, the first receiving unit and the second receiving unit may be formed such that the short side of the first receiving unit when viewed in a horizontal sectional view and the short side of the second receiving unit when viewed in a horizontal sectional view are opposite each other.

The battery case may be made of a single member, and when the battery case is in the assembled position, the bridge region may be bent such that the first receiving unit and the second receiving unit overlap each other.

In a concrete example, the recessed portion may have a rectangular or oval shape.

Specifically, in the case in which the depth of the recessed portion is less than 20% of the depth of the first receiving unit, it is difficult to secure sufficient rigidity of the bridge region. In the case in which the depth of the recessed portion is greater than 50% of the depth of the first receiving unit, on the other hand, the bridge region may be cracked or torn, since the battery case is made of a laminate sheet. Furthermore, it is difficult to maintain the shape of the recessed portion. For these reasons, it is preferable for a depth of the recessed portion to be 20% to 50% of a depth of the first receiving unit.

In addition, when the battery case is in the initial position, the long side of the recessed portion may be parallel to the long side of the first receiving unit and parallel to the long side of the second receiving unit, and a length of the long side of the recessed portion may be 70% to 90% of a length of the long side of the first receiving unit.

In accordance with another aspect of the present invention, there is provided a method of manufacturing the battery cell, the method including (a) forming a first receiving unit and a second receiving unit in a battery case, (b) forming a recessed portion in a bridge region of the battery case located between the receiving units, (c) bending the bridge region such that the first receiving unit and the second receiving unit overlap each other, (d) thermally fusing a portion of the first receiving unit to a portion of the second receiving unit in a region in which the first and second receiving units overlap each other, to form a sealed portion that excludes an unsealed injection port on one side of the first and second receiving units, (e) injecting an electrolytic solution through the injection port into the receiving units, (f) forming a seal closing the injection port by thermal fusion, (g) performing charging and discharging of the battery cell in order to activate the battery cell, and (h) collecting gas generated during step (g) in a gas pocket and discharging the gas and a surplus portion of the electrolytic solution from the gas pocket.

In accordance with another aspect of the present invention, there is provided a battery pack including the battery cell. The battery pack may be manufactured by combining battery cells, which are used as unit batteries of the battery pack, based on the desired output and capacity of the battery pack.

In accordance with a further aspect of the present invention, there is provided a device including the battery pack. The device may be a laptop computer, a netbook computer, a tablet PC, a cellular phone, an MP3 player, a wearable electronic device, a power tool, an electric vehicle (EV), a hybrid electric vehicle (HEV), a plug-in hybrid electric vehicle (PHEV), an electric bicycle (E-bike), an electric scooter (E-scooter), an electric golf cart, or a power storage system.

The structure and manufacturing method of the device are well known in the art to which the present invention pertains, and a detailed description thereof will thus be omitted.

BRIEF DESCRIPTION OF DRAWINGS

FIG. 1 is a schematic view showing a process of manufacturing a conventional battery cell;

FIG. 2 is a front view showing a battery case used in order to manufacture a battery cell according to an embodiment of the present invention;

FIG. 3 is a side view of the battery case shown in FIG. 2;

FIG. 4 is a front view showing a battery case used in order to manufacture a battery cell according to another embodiment of the present invention; and FIG. 5 is a schematic view showing a portion of the battery case having a uniform external appearance as the result of forming the recessed portion according to the present invention in the bridge region.

BEST MODE

Now, exemplary embodiments of the present invention will be described in detail with reference to the accompanying drawings. It should be noted, however, that the scope of the present invention is not limited by the illustrated embodiments.

FIG. 2 is a front view showing a battery case used in order to manufacture a battery cell according to an embodiment of the present invention, and FIG. 3 is a side view of the battery case shown in FIG. 2.

Referring to FIGS. 2 and 3, a first receiving unit 111 and a second receiving unit 112 are formed in a battery case 100, which is made of a single member, and the receiving units 111 and 112 are spaced apart from each other.

Between the receiving units 111 and 112 is located a bridge region 120 for interconnecting the receiving units 111 and 112, and a recessed portion 113, which is recessed in the depth direction of each of the receiving units, is formed in the bridge region 120.

Each of the first receiving unit 111 and the second receiving unit 112 is formed so as to have a rectangular structure, and the first receiving unit 111 and the second receiving unit 112 are formed in the battery case 100 such that the long side 111a of the first receiving unit 111 when viewed in a horizontal sectional view and the long side 112a of the second receiving unit 112 when viewed in a horizontal sectional view are opposite each other. The depth of the first receiving unit 111 is greater than the depth of the second receiving unit 112.

FIG. 4 is a front view showing a battery case used in order to manufacture a battery cell according to another embodiment of the present invention.

Referring to FIG. 4, a first receiving unit 211 and a second receiving unit 212 are formed in a battery case 200, the receiving units are spaced apart from each other, and a recessed portion 213 is formed between the receiving units 211 and 212.

Each of the first receiving unit 211 and the second receiving unit 212 is formed so as to have a rectangular structure, and the first receiving unit 211 and the second receiving unit 212 are formed in the battery case 200 such that the short side 211b of the first receiving unit 211 when viewed in a horizontal sectional view and the short side 212b of the second receiving unit 212 when viewed in a horizontal sectional view are opposite each other.

Referring to FIGS. 2 to 4, the recessed portion 113 or 213 is formed in the bridge region 120 or 220, which interconnects the first receiving unit 111 or 211 and the second receiving unit 112 and 212. The recessed portion 113 or 213 is formed to have a rectangular structure, which corresponds to the shape of each of the recessed portions. However, the present invention is not limited thereto.

The battery case 100 or 200 is made of a single member. In the state in which the electrode assembly is received in the receiving units, therefore, the bridge region 120 or 220 is bent such that the first receiving unit 111 or 211 and the second receiving unit 112 and 212 overlap each other, whereby the electrode assembly is isolated from the outside of the battery case 100 or 200.

FIG. 5 is a schematic view showing a portion of the battery case having a uniform external appearance as the result of forming the recessed portion according to the present invention in the bridge region.

Referring to FIG. 5 together with FIG. 2, the recessed portion 113 is formed in the bridge region 120 of the battery case 100, whereby it is possible to prevent the bridge region 120 from being dented into the battery case 100.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery cell according to the present invention is configured to have a structure in which the recessed portion is locally formed in the bridge region. Consequently, it is possible to prevent the bridge region from being dented into the battery case at the time of bending the battery case, whereby it is possible to provide a battery cell having a uniform external appearance.

The invention claimed is:

1. A battery cell, comprising:
a battery case having an initial position and an assembled position; and
an electrode assembly comprising a positive electrode, a negative electrode, and a separator interposed between the positive electrode and the negative electrode, the electrode assembly being mounted in the battery case in the assembled position,
wherein the battery case includes:
a first receiving unit and a second receiving unit formed in the battery case and spaced apart from each other when the battery case is in the initial position, the first and second receiving units receiving a respective portion of the electrode assembly when the battery case is in the assembled position;
a bridge region having a recessed portion that is recessed in a direction identical to a depth direction of each of the receiving units when the battery case is in the initial position; and
first and second intermediate regions between the respective first and second receiving units and the bridge region, a part of a surface of each of the first and second intermediate regions lying along a same plane when the battery case is in the assembled position.

2. The battery cell according to claim 1, wherein each of the first receiving unit and the second receiving unit has a rectangular shape.

3. The battery cell according to claim 2, wherein a depth of the second receiving unit is 50% to 80% of a depth of the first receiving unit.

4. The battery cell according to claim 2, wherein when the battery case is in the initial position, a long side of the first receiving unit when viewed in a horizontal sectional view and a long side of the second receiving unit when viewed in a horizontal sectional view are opposite each other.

5. The battery cell according to claim 2, wherein when the battery case is in the initial position, a short side of the first receiving unit when viewed in a horizontal sectional view and a short side of the second receiving unit when viewed in a horizontal sectional view are opposite each other.

6. The battery cell according to claim 1, wherein the battery case is made of a single member, and when the battery case is in the assembled position, the bridge region is bent such that the first receiving unit and the second receiving unit overlap each other.

7. The battery cell according to claim 1, wherein the recessed portion has a rectangular or oval shape.

8. The battery cell according to claim 7, wherein a depth of the recessed portion is 20% to 50% of a depth of the first receiving unit.

9. The battery cell according to claim 7, wherein when the battery case is in the initial position, a long side of the recessed portion is parallel to a long side of the first receiving unit and to a long side of the second receiving unit, and a length of the long side of the recessed portion is 70% to 90% of a length of the long side of the first receiving unit.

10. A method of manufacturing a battery cell, the method comprising:
(a) forming a first receiving unit and a second receiving unit in a battery case;
(b) forming a recessed portion in a bridge region of the battery case located between the receiving units;
(c) bending the bridge region such that the first receiving unit and the second receiving unit overlap each other;
(d) thermally fusing a portion of the first receiving unit to a portion of the second receiving unit in a region in which the first and second receiving units overlap each other, to form a sealed portion that excludes an unsealed injection port on one side of the first and second receiving units;
(e) injecting an electrolytic solution through the injection port into the receiving units;
(f) forming a seal closing the injection port by thermal fusion;
(g) performing charging and discharging of the battery cell in order to activate the battery cell; and
(h) collecting gas generated during step (g) in a gas pocket and discharging the gas and a surplus portion of the electrolytic solution from the gas pocket.

11. A battery pack comprising the battery cell according to claim 1.

12. A device comprising the battery pack according to claim 11.

13. The device according to claim 12, wherein the device is a laptop computer, a netbook computer, a tablet PC, a cellular phone, an MP3 player, a wearable electronic device, a power tool, an electric vehicle (EV), a hybrid electric vehicle (HEV), a plug-in hybrid electric vehicle (PHEV), an electric bicycle (E-bike), an electric scooter (E-scooter), an electric golf cart, or a power storage system.

\* \* \* \* \*